US012665652B2

(12) United States Patent

Mudulodu

(10) Patent No.: US 12,665,652 B2

(45) Date of Patent: Jun. 23, 2026

(54) SYSTEM, METHOD AND APPARATUS FOR ANTENNA SELECTION IN A WIRELESS COMMUNICATION SYSTEM

(71) Applicant: Silicon Laboratories Inc., Austin, TX (US)

(72) Inventor: Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 369 days.

(21) Appl. No.: 18/325,474

(22) Filed: May 30, 2023

(65) Prior Publication Data

US 2024/0333371 A1 Oct. 3, 2024

Related U.S. Application Data

(60) Provisional application No. 63/492,686, filed on Mar. 28, 2023.

(51) Int. Cl.
*H04B 7/06* (2006.01)
*H04B 7/08* (2006.01)

(52) U.S. Cl.
CPC .................................... *H04B 7/082* (2013.01)

(58) Field of Classification Search
None
See application file for complete search history.

(56) References Cited

U.S. PATENT DOCUMENTS 8,437,415 B2 5/2013 Mudulodu et al.
8,644,426 B1 2/2014 Zhou et al.

10,827,451 B2 11/2020 Mudulodu
11,632,733 B2 4/2023 Mudulodu et al.
2007/0155341 A1 7/2007 Haiut
2010/0195754 A1* 8/2010 Li ......................... H04B 7/0805
375/267
2015/0003380 A1* 1/2015 Ling .................... H04B 7/0404
370/329
2021/0075557 A1 3/2021 Mudulodu et al.
2022/0104042 A1* 3/2022 Nakano .................... H04B 1/30
2022/0381868 A1* 12/2022 Ben-Shachar ............ G01S 3/46
2025/0132874 A1* 4/2025 Gao ...................... H04W 52/02

FOREIGN PATENT DOCUMENTS

CN 102571182 A * 7/2012 ............. H04B 7/082
CN 107801224 A * 3/2018 ......... H04W 36/302
CN 118100966 A * 5/2024 ............... H04B 1/16
EP 4148904 A1 * 3/2023 ............... H01Q 9/42
WO WO-9408404 A1 * 4/1994 ......... H04B 7/0811
WO WO-2005046066 A1 * 5/2005 ......... H04B 17/346
WO WO-2021083728 A1 * 5/2021 ......... H04B 7/0811

* cited by examiner

*Primary Examiner* — Mohammed Rachedine
(74) *Attorney, Agent, or Firm* — Trop, Pruner & Hu, P.C.

(57) ABSTRACT

In one example, an apparatus includes: an analog front end (RF) circuit to receive and process, from a first antenna and a second antenna, a radio frequency (RF) signal to obtain a digital signal, the RF circuit having a single RF signal processing path; a baseband circuit coupled to the RF circuit to process the digital signal, the baseband circuit to determine a first metric for a first packet of the RF signal received via the first antenna; and an antenna selection controller coupled to the baseband circuit, the antenna selection controller to cause the RF circuit to switch from receipt of the RF signal via the second antenna to receipt of the RF signal via the first antenna based at least in part on the first metric.

16 Claims, 6 Drawing Sheets

100

300

SYSTEM, METHOD AND APPARATUS FOR ANTENNA SELECTION IN A WIRELESS COMMUNICATION SYSTEM

CROSS-REFERENCE TO RELATED APPLICATION

This application claims the benefit of U.S. Provisional Application No. 63/492,686, filed on Mar. 28, 2023, and entitled "SYSTEM, METHOD AND APPARATUS FOR ANTENNA SELECTION IN A WIRELESS COMMUNICATION SYSTEM."

BACKGROUND

Many modern wireless communication systems use multiple antennas to increase throughput and reliability/robustness. Multiple antenna technology has been widely in use in wireless local area network (WLAN) systems where reliability and throughput are critical.

A communication system can have multiple antennas and multiple Radio Frequency (RF) signal processing paths. However, some systems have multiple antennas and a single RF signal processing path. In such systems, there are difficulties and inefficiencies in determining a best antenna for reception among the multiple antennas.

SUMMARY OF THE INVENTION

In one aspect, an apparatus comprises a radio frequency (RF) circuit to receive and process, from a first antenna or a second antenna, a RF signal, the RF circuit to obtain a digital signal from the RF signal, and the RF circuit having a single RF signal processing path; a baseband circuit coupled to the RF circuit to process the digital signal, the baseband circuit to determine a first metric for a first packet of the RF signal received via the first antenna; and an antenna selection controller coupled to the baseband circuit, the antenna selection controller to cause the RF circuit to switch from receipt of the RF signal via the first antenna to receipt of the RF signal via the second antenna based at least in part on the first metric.

In an implementation, the antenna selection controller is to cause the RF circuit to switch from receipt of the RF signal via the first antenna to receipt of the RF signal via the second antenna for receipt of a first management packet of the RF signal. The baseband circuit may determine a first channel quality metric for the first management packet and cause the RF circuit to switch from receipt of the RF signal via the first antenna to receipt of the RF signal via the second antenna based at least in part on the first channel quality metric. The antenna selection controller may send an antenna control signal to the RF circuit to cause the RF circuit to switch from the receipt of the RF signal via the first antenna to the receipt of the RF signal via the second antenna, when the first channel quality metric is less than a threshold. A plurality of channel quality metrics may be obtained corresponding to a plurality of antennas using the first management packet. The antenna selection controller may cause the RF circuit to switch from receipt of the RF signal via the first antenna to receipt of the RF signal via the second antenna when the first channel quality metric is less than a threshold.

In an embodiment, the baseband circuit is to determine the first metric based on a channel estimate, after detection of the first packet. The baseband circuit may determine the first metric based on an error vector magnitude value.

In an embodiment, the antenna selection controller is to cause the RF circuit to switch from receipt of the RF signal via the first antenna to receipt of the RF signal via the second antenna during receipt of the first packet. A switching from receipt of the RF signal via the first antenna to receipt of the RF signal via the second antenna may occur during a cyclic prefix portion of first packet.

The antenna selection controller also may cause the RF circuit to switch from the receipt of the RF signal via the first antenna to the receipt of the RF signal via the second antenna during the receipt of the first packet when an expected signal strength of the first packet exceeds a threshold. The baseband circuit may determine the first metric based on: a first training field of the first packet received via the first antenna; and a second training field of the first packet received via the second antenna.

In an embodiment, the apparatus is to: receive a first portion of the first packet via the first antenna, decode a MAC address of the first packet, and determine the first metric comprising a first channel quality metric for the first portion of the first packet received via the first antenna; and receive a second portion of the first packet via the second antenna and determine a second channel quality metric for the second portion of the first packet received via the second antenna. The apparatus may further: receive a third portion of the first packet via a third antenna; determine a third channel quality metric for the third portion of the first packet received via the third antenna; and select one of the first, second and third antennas for receipt of a next packet based on at least one of the first channel quality metric, the second channel quality metric, or the third channel quality metric.

In one or more embodiments, after the switch from the first antenna to the second antenna, the apparatus is to transmit a second RF signal via the second antenna.

According to another aspect, a method includes: receiving, in an RF circuit of a wireless device via a first antenna and a second antenna, a RF signal comprising a packet; processing, in the RF circuit, a first portion of the packet received via the first antenna to obtain a first digital signal; processing, in the RF circuit, a second portion of the packet received via the second antenna to obtain a second digital signal; selecting one of the first antenna and the second antenna for reception of one or more packets of the RF signal based on at least one of a first CQ metric associated with the first digital signal and a second CQ metric associated with the second digital signal; and switching a current antenna of the wireless device from the current antenna to the selected antenna if the current antenna is not the selected antenna.

In an implementation, the method further comprises: receiving the RF signal via the first antenna during a first preamble field of the packet; and receiving the RF signal via the second antenna during a second preamble field of the packet. The method may further include determining the first CQ metric based at least in part on a channel estimate.

In an embodiment, the method further comprises: setting automatic gain control (AGC) circuitry of the RF circuit to a predetermined level; and thereafter receiving the RF signal comprising the packet via the first antenna, wherein the predetermined level is based at least in part on an AGC setting of a previous packet of the RF signal.

When the packet is not destined for the wireless device, the method may include determining the first CQ metric and the second CQ metric based at least in part on the packet.

In yet another aspect, a wireless device includes: a first antenna to receive a RF signal from an access point; a second antenna to receive the RF signal from the access point; a RF front end circuit coupled to the first antenna and the second antenna, the RF front end circuit to receive and process the RF signal to obtain a digital signal, the RF front end circuit having a single RF signal processing path; a baseband circuit coupled to the RF front end circuit to process the digital signal, the baseband circuit to determine a first metric for a first portion of the RF signal received via the first antenna and a second metric for a second portion of the RF signal received via the second antenna; and a control circuit coupled to the baseband circuit, the control circuit to cause the RF front end circuit to switch from receipt of the RF signal via the first antenna to receipt of the RF signal via the second antenna based on at least one of the first metric or the second metric.

In an embodiment, the wireless device is to use the selected antenna for a next uplink transmission to the access point.

DETAILED DESCRIPTION

In various embodiments, a communication system is configured with control techniques to efficiently determine a best antenna to use for reception (and transmission) when there are more antennas available than a number of RF signal processing paths.

In WLAN systems, two devices that communicate with each other are a station and an access point (AP). While embodiments are described in context of a station, the techniques can equally be used at an AP or other wireless device. An AP may send management packets and broadcast packets at a lower rate than other packets (e.g., 6 megabits per second (mbps) or modulation and coding scheme (MCS) 0 modulation) so that all stations including those far off from the AP can receive them. This lower rate is achieved by modulating the packets with a less complex modulation scheme, so that these packets can be decoded even at a low Signal-to-Noise Ratio (SNR). Beacons are a type of management packet that are periodically transmitted by an AP, and stations associated with the AP have a priori knowledge of the time at which a beacon packet is available at its antenna for reception.

In some cases, an AP may employ rate adaptation to transmit packets at a certain modulation and coding selection (MCS) to the station. The MCS chosen can depend on various factors such as the location and distance between the AP and the station, channel conditions, etc.

In wireless systems that have equal numbers of RF signal processing paths and antennas, signals can be simultaneously received via all the antennas and a selection can be made by observing the signals. However, this is not the case in a receiver having a single RF signal processing path and multiple antennas. Embodiments disclosed here provide techniques for antenna selection that result in increased overall system performance. While particular techniques are disclosed for determination of a most appropriate antenna for use, understand that different combinations or variations in these techniques are possible. Further, although embodiments are described in the context of a WLAN, understand that the techniques disclosed herein can be applied to any multi-antenna system.

Figure 1:
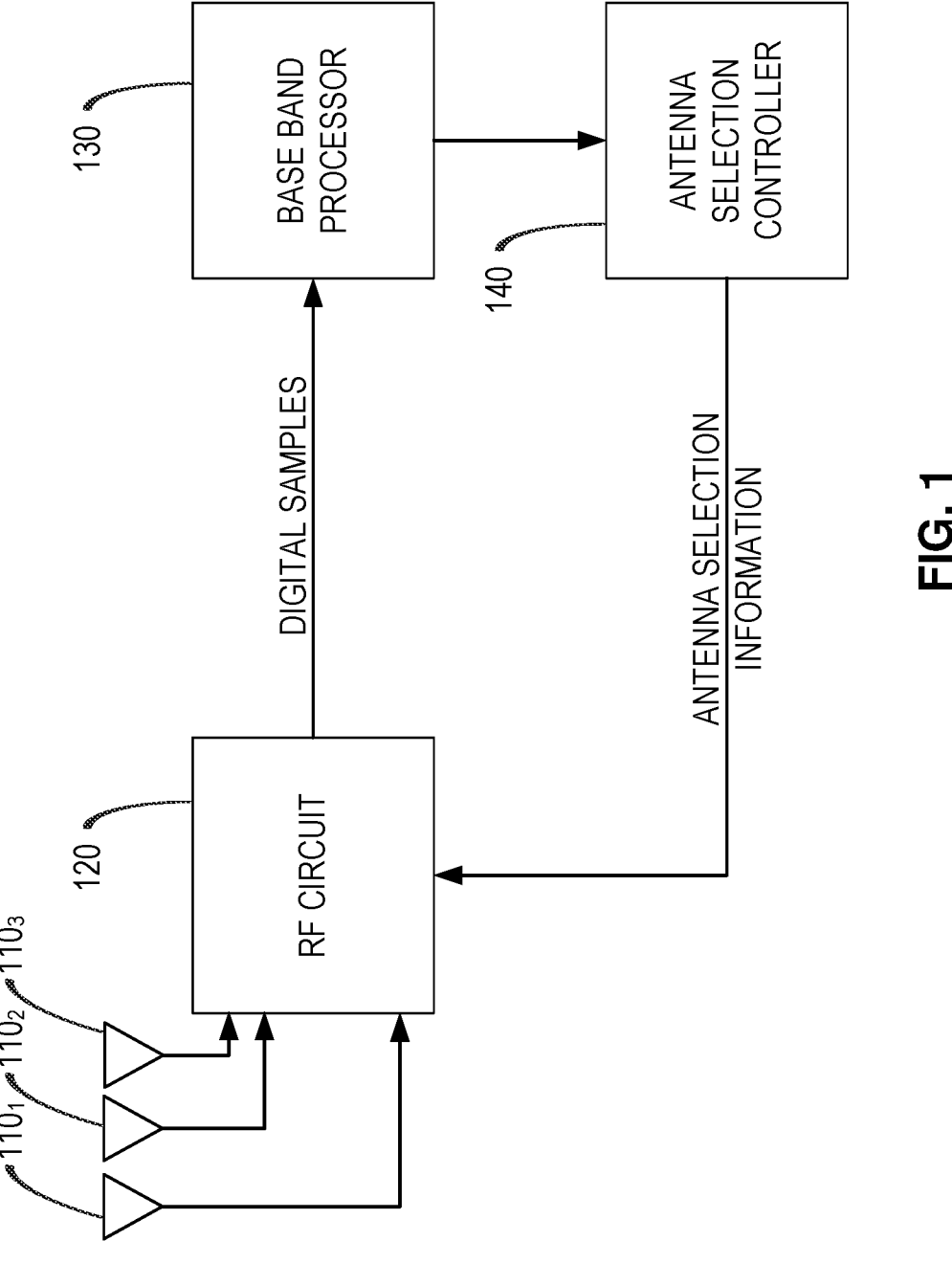
FIG. 1 is a block diagram of a WLAN station in accordance with an embodiment.

Referring now to FIG. 1, shown is a block diagram of a WLAN station in accordance with an embodiment. As shown in FIG. 1, station 100 includes a plurality of antennas $110_{1-3}$ for reception of RF signals and a single RF analog front end (RF) circuit 120. RF circuit 120 processes a received RF analog signal via various stages of a single RF signal processing path and outputs digital samples to a baseband processor (also referred to herein as a baseband processing unit) 130. In general, RF circuit 120 performs operations including amplification via a low noise amplifier (LNA) and/or associated gain control circuitry, down conversion via a mixer, and analog front end circuitry converts the mixer output or downconverted analog signal to digital samples via an analog-to-digital converter (ADC). RF circuit 120 also performs optional operations such as filtering and other signal processing operations. Baseband processor 130 sends certain information to an antenna selection controller (also referred to as an antenna selection control unit) 140. Although shown as a separate circuit in FIG. 1, in some cases, antenna selection controller 140 may be included as part of baseband processor 130.

Based at least in part on this information (digital samples, details of which will be described below), antennal selection controller 140 determines a most appropriate antenna for current conditions for reception of current or next packets of information. Antenna selection controller 140, from this determination, sends antenna selection control information to RF circuit 120. Based on this control information, RF circuit 120 performs antenna selection/switching. To this end, RF circuit 120 may include appropriate switching circuitry to cause RF signals to be provided to the single RF receiver signal processing path of RF circuit 120 to be selected from a given one of antennas 110.

In an embodiment, a station switches reception from one antenna to another antenna after complete reception of a current packet, in what is referred to herein as "inter-packet antenna switching." Consider a station with K antennas, where the station can use each antenna at a time for reception of a beacon from an AP. In an embodiment, a baseband processor may calculate or otherwise determine one or more metrics associated with each antenna. For one example, let a channel quality metric CQ_k_p be a metric computed on a beacon 'p' received using antenna 'k' (where "CQ" stands for channel quality).

The expected time of the beacons is already known to the station, and it can switch through the antennas one after another to determine the CQ metric for each of the antennas, such that at least one beacon/packet from the AP is received by each antenna. Based at least in part on this set of CQ metrics determined for each of the antennas, the antenna selection controller can determine a best antenna for communication with that AP. In this way, improved link performance is achieved between the station and AP.

Note that during antenna selection determinations, there may be a case, e.g., due to a bad antenna selection, where a decoded packet results in a cyclic redundancy checksum (CRC) error or other error, yet the station may still be able to measure at least one type of CQ metric. In another situation, the station may not be able to detect/see any packet for decoding or CQ measurement, due to the bad antenna selection. In such a case, the CQ measurement is assigned an invalid value, so that this antenna/measurement is not considered for further selection/processing. The station can determine the packet detection (PD) failure for a packet received at a particular antenna, as the station is aware of the time at which the beacon is expected, and PD should happen within a specific duration or time frame.

In an embodiment, a CQ measurement and antenna selection process may be initiated when a CQ metric for a current antenna falls below a threshold value. In an embodiment, this threshold value may be set equal to a sum of a minimum value and a margin, namely a 'min CQ' for a beacon and a 'CQ margin.' In another embodiment, a station may be configured to switch to a next best antenna (based on pre-measured metrics), instead of performing the CQ measurement again on all antennas. As an example, assume a CQ metric range between 0 to 100 and a threshold value of 25. With these assumptions, the CQ measurement and antenna selection process is performed only if the CQ metric measured for a current antenna falls below 25.

Note that the CQ metric may be determined in a variety of manners. In an embodiment, the CQ metric may be determined based at least in part on a channel estimate (which occurs after successful packet detection and Long Training Field (LTF) processing) of a WLAN Orthogonal Frequency Division Multiplexing (OFDM) communication. The channel estimate can be obtained by using at least one LTF period in the legacy LTF (L-LTF) field (as there are two repetitions here), by converting time domain samples to frequency domain using a fast Fourier transform (FFT) engine and multiplying with a known LTF sequence (X), as shown in Equation 1.

$$H(k) = Y(k) * X(k) \qquad \text{[Eq. 1]}$$

In Equation 1, Y(k) is the LTF in the frequency domain.

In one embodiment, the CQ metric may be determined based at least in part on a Short Training Field (STF) of a WLAN OFDM packet. In another embodiment, where inter-packet switching is performed and actual bits or constellation symbols are processed at the receiver, an error vector magnitude (EVM) measurement (e.g., averaged across time and frequency) can be used as the CQ metric.

In other implementations, intra-packet antenna switching may be performed in which a station switches reception from one antenna to another antenna during a current packet reception. In a WLAN-Direct Sequence Spread Spectrum (DSSS) case, preamble durations are 144 microseconds (usec) (long preamble), 72 µsec (short preamble), and the preamble portion of a packet after Automatic Gain Control (AGC) convergence is used for metric measurements and antenna switching.

In a WLAN-OFDM case, a preamble duration is 8 usec and intra-packet antenna switching during the short preamble duration after AGC convergence may not be possible. In this case, an AGC setting from a previous packet received on a given antenna can be used as an initial gain setting, allowing faster AGC convergence. In this implementation, a remainder of a portion of the L-STF after AGC convergence is used for the measurement and switching process. For example, assume LNA and variable gain amplifier (VGA) gain settings for reception of packet N on antenna K are 20 decibels (dB) and 5 dB respectively. In this case, the AGC starts the first measurement for packet N+1 after applying the initial gains as LNA of 20 dB and VGA of 5 dB. (This is based on assuming that the channel or environment between the station and AP is not changed between the two packets). By doing this, the AGC convergence time is reduced from 6 µsec to as low as 2 usec. In another embodiment, the AGC can be set to a fixed gain setting based on a previous packet and an additional programmable gain. In this way, more time may be allowed for measurement and switching processes, as there is no AGC convergence and carry-on reception with the chosen antenna.

In an embodiment, the CQ metric measured during the L-STF field is a received strength of signal indicator (RSSI). In an embodiment where the SNR of a packet is sufficiently low such that packet detection occurs first (instead of the AGC reacting to the packet), intra-packet antenna switching is not performed. Thus in some cases, intra-packet antenna switching is only performed on antennas where an expected RSSI (metric) is greater than a threshold. Note that the expected RSSI metric can be based on a previous measured value for a given antenna.

In yet another embodiment, an entire packet can be used to measure a RSSI-type CQ metric across multiple candidate antennas, which may occur once PD occurs on a beacon. In this case, the beacon/packet would be lost as it is not completely received by any antenna. Since the AP does not receive an acknowledge (ACK) for this packet, it will resend the same packet. The antenna to be selected for use for reception of this re-tried packet from the AP may be the best antenna determined based on the CQ metrics obtained from the previous packet. This technique may be performed less frequently, as it may affect throughput.

In a further embodiment, a CQ metric is computed based at least in part on receipt via a first antenna of a L-STF of a packet, and then switching to a second antenna for receipt of a next field of the packet, namely the L-LTF. The switching may occur during a Cyclic Prefix (CP) portion of the L-LTF. Here the CQ metric is obtained on the L-STF for the first antenna and on the L-LTF for the second antenna. In one implementation, two periods of the L-LTF can be combined to obtain a channel estimate on the combined version.

Figure 2:
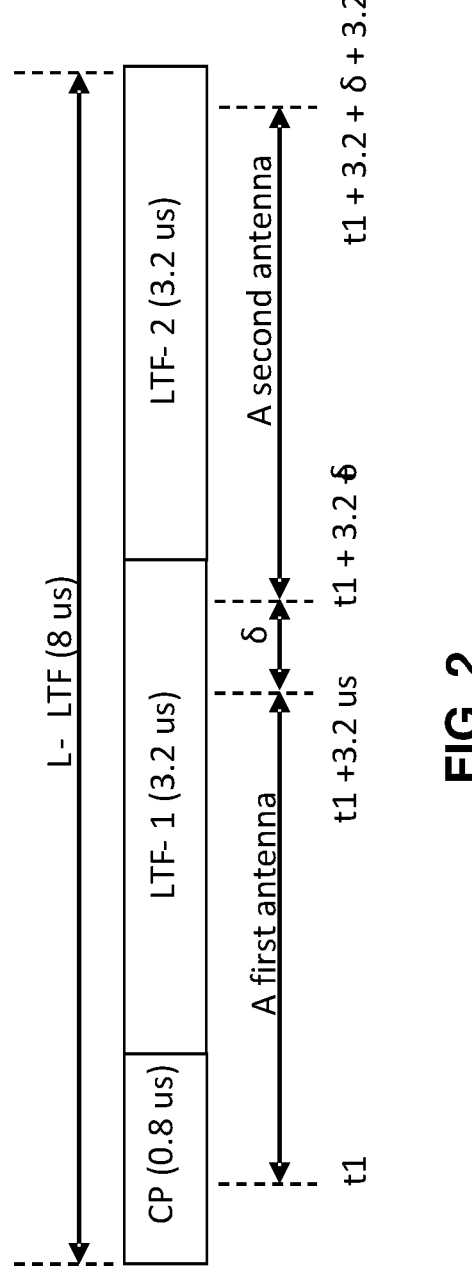
FIG. 2 is a graphical illustration of an antenna switching process in accordance with an embodiment.

In another implementation, instead of combining the two periods of the L-LTF (and to accommodate for switching time), the first antenna is used from time t1 to t1+3.2 and the second antenna is used for time t1+3.2+δ to t1+3.2+δ+3.2 as shown in FIG. 2, which is a graphical illustration of an antenna switching process in accordance with an embodiment.

In another implementation, a station decodes a MAC address by receiving a packet with an antenna thus far known and based on the decoded MAC address, the remaining portion of the packet is used to determine a CQ metric across all the antennas to decide the best candidate antenna for a next reception. Such operation may occur when the packet is not destined to the station. Note that such un-destined packet may conventionally be dropped by the station. But here, instead of dropping the un-destined packet, the packet is processed to obtain CQ metrics across all the antennas for use in determining a best antenna.

Depending on implementation, the CQ metric computed may be a RSSI, a constellation EVM, or a metric based on a frequency response when a packet is phase-shift keying (PSK) modulated. As an example, if y(k) is the frequency response of a received signal, then the metric is $\Sigma \, y(k)$, where k is in the range 0 to K−1 and K is the number of sub-carriers.

In an embodiment, where the received packet at the station is an IEEE 802.11ax format, a best candidate antenna (BCA) is used for L-LTF reception, and another test candidate antenna (TCA) is used for High Efficiency-LTF (HE-LTF) reception. If the TCA turns out to be better than the BCA, then the channel estimate is available from HE-LTF and the processing continues. But in the case where the BCA is better than the TCA, the channel estimate is obtained from the L-LTF channel estimate using techniques such as interpolation or up-sampling and filtering (as there are more sub-carriers in the HE portion as compared to the non-HE portion).

In a WLAN system, the CQ metric measurement can be done on management packets, where the station has a priori knowledge of the time at which the management packet is expected from the AP. Unlike beacons that are frequently/regularly transmitted by the AP, management packets are not regularly transmitted. Examples of management packet formats include probe request, probe response, association and reassociation packet, etc.

In different implementations, intra-packet antenna switching related processing is handled/implemented in hardware and the inter-packet antenna switching related processing is handled/implemented in software. Note that the CQ measurement and antenna selection process can be performed periodically, e.g., according to a predetermined schedule.

Note that the best antenna selected for receiving a packet can be used for transmission of a packet from the station to the same AP. In this way, link performance can be increased in both directions.

Figure 3A:
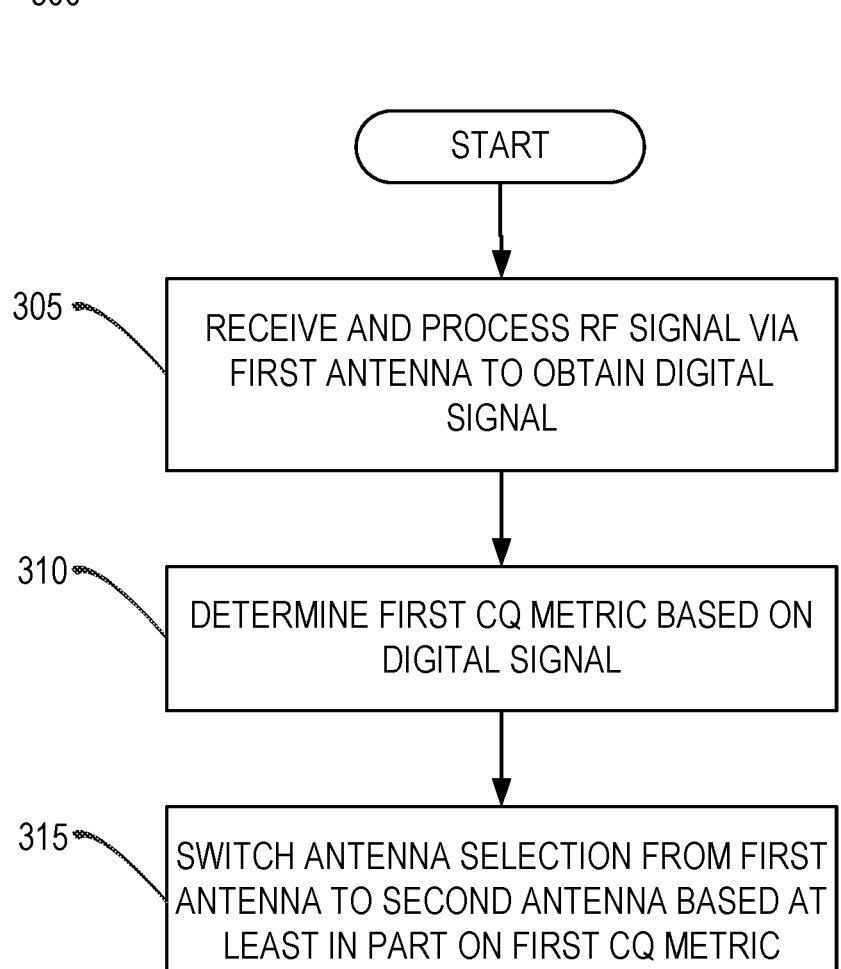
FIG. 3A is a flow diagram of a method in accordance with an embodiment.

Referring now to FIG. 3A, shown is a flow diagram of a method in accordance with an embodiment. As shown in FIG. 3A, method 300 is a high-level method for selecting a most appropriate antenna for communication between a station and an AP. As such, method 300 may be performed by circuitry of a wireless device, including analog front end circuitry, baseband processing circuitry, and an antenna selection controller alone and/or in combination with firmware and/or software.

As illustrated, method 300 begins by receiving an RF signal via a first antenna of the wireless device (block 305). This RF signal may be processed in the RF circuit to obtain a digital signal corresponding to the RF signal. Thereafter, at block 310, a first CQ metric may be determined based on the digital signal. As discussed above, different manners of determining a CQ metric may occur in different implementations. Then at block 315, an antenna selection and switching may be performed based at least in part on this first CQ metric. More specifically, this antenna switch is from the first antenna to a second antenna. This second antenna may be used for reception/transmission (e.g., until a CQ metric associated with the second antenna does not reach to an undesired level).

Note that this high-level view in FIG. 3A represents a base antenna selection process, which may be initiated when the first CQ metric falls below a threshold level. Also note that although shown at a very high level, additional operations are possible. For example, in addition to determining the first CQ metric from the first antenna reception of the RF signal, an antenna switching determination may further proceed based on one or more additional CQ metrics determined from the RF signal as it is received from the second (or one or more additional) antennas. Although shown at this high level in the embodiment of FIG. 3A, many variations and alternatives are possible.

Figure 3B:
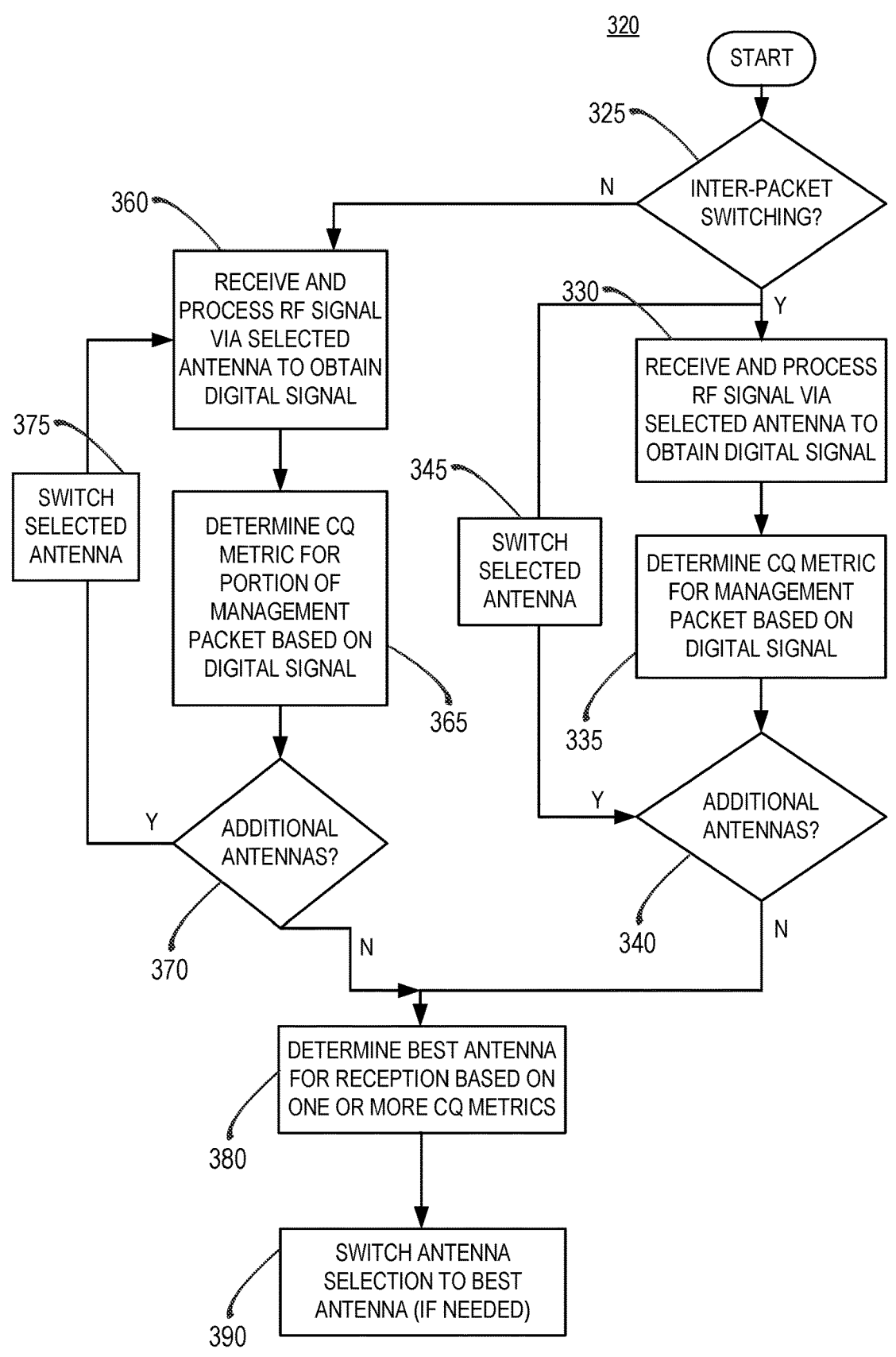
FIG. 3B is a flow diagram of a method in accordance with another embodiment.

Referring now to FIG. 3B, shown is a flow diagram of a method in accordance with another embodiment. More specifically, method 320 is a more detailed method for selecting a most appropriate antenna for communication between a station and an AP (and which may be performed by the same components described above).

As illustrated, method 320 begins by determining whether the wireless device is configured for inter-packet switching (diamond 325). If so, control passes to block 330, where an RF signal that includes a management packet is received via a first antenna of the wireless device and processed to obtain a digital signal corresponding to the RF signal (block 330). Thereafter at block 335, a first CQ metric may be determined for the management (or beacon or any other packet) packet based on the digital signal.

Still with reference to FIG. 3B, next it is determined whether there are additional antennas to be evaluated (diamond 340). If so, control passes to block 345 where an antenna switch occurs to select a next antenna (e.g., via switching circuitry present in the analog front end circuit). Control thereafter proceeds back to block 330 for an iterative process to be performed to obtain CQ metrics for multiple packets, each associated with a different antenna.

Still referring to FIG. 3B, when all available antennas have been considered, control passes to block 380 where a best antenna for reception may be determined based on the CQ metrics determined above. For example, an antenna associated with the CQ metric having a highest value may be selected as the best antenna for reception. Then control passes to block 390 where the antenna selection is switched to the best antenna. Note that if the antenna selection is already set to the best antenna, of course no switching need be performed.

Still referring to FIG. 3B, instead if it is determined that inter-packet switching is not active, this means that antenna switching is to be performed on an intra-packet basis. In this situation, control passes from diamond 325 to block 360 (and blocks 365, 375 and diamond 370) in which similar operations to determine CQ metrics for multiple antennas proceed. However here these CQ metrics are determined/computed based on different portions (e.g., different preamble fields) of a single packet. After all antennas are considered (as determined at diamond 370), the determination of the best antenna and switching, if needed, occurs as discussed above, at blocks 380 and 390. Although shown at this high level in the embodiment of FIG. 3B, many variations and alternatives are possible.

Figure 4:
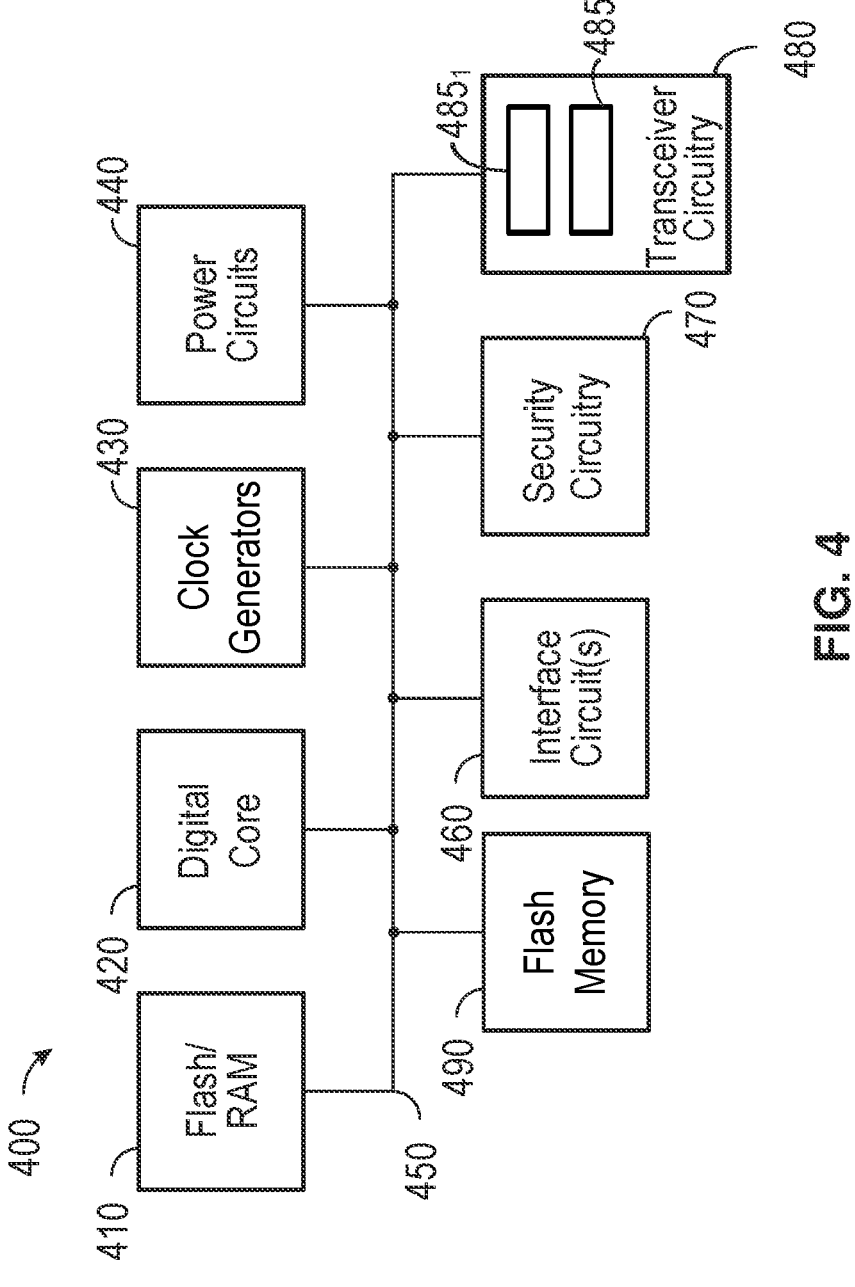
FIG. 4 is a block diagram of a representative integrated circuit that incorporates an embodiment.

Referring now to FIG. 4, shown is a block diagram of a representative integrated circuit 400 that includes antenna selection circuitry as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, other consumer devices, or industrial, scientific, and medical (ISM) devices, among others.

In the embodiment shown, integrated circuit 400 includes a memory system 410 which in an embodiment may include volatile storage, such as RAM and non-volatile memory as a flash memory. As further shown integrated circuit 400 also may include a separate flash memory 490 (or other non-volatile memory), optionally. Flash memory 490 may be implemented as a non-transitory storage medium that can store instructions and data. Such non-volatile memory may store instructions, including instructions for performing antenna switching control, as described herein.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC.

As further illustrated, IC 400 further includes power circuitry 440, which may include one or more voltage regulators. Additional circuitry may optionally be present depending on particular implementation to provide various functionality and interaction with external devices. Such circuitry may include interface circuitry 460 which may provide a LAN or other interface with various off-chip devices, and security circuitry 470 which may perform wireless security techniques.

In addition as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 480 includes switching circuitry 4851 that can switch a selected antenna to be part of a single RF signal processing path, under control of an antenna selection circuit 4852. Understand while shown with this high level view, many variations and alternatives are possible.

Figure 5:
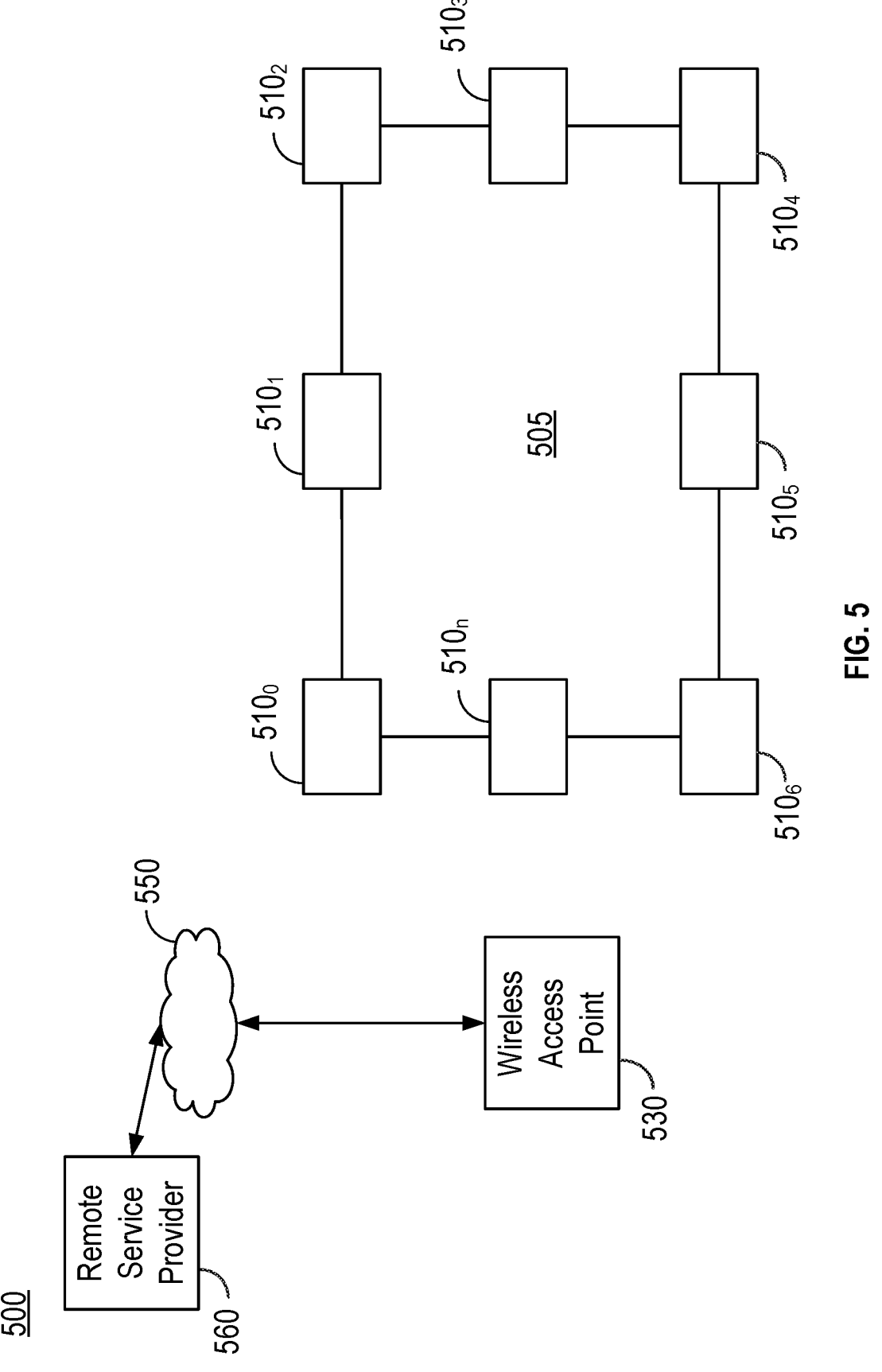
FIG. 5 is a high level diagram of a network in accordance with an embodiment.

ICs such as described herein may be implemented in a variety of different devices such as wireless stations, IoT devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments to improve reliability of communication between devices and access points.

In the embodiment of FIG. 5, a wireless network 505 is present, e.g., in a building having multiple wireless devices 5100-*n*. As shown, wireless devices 510 couple to an access point 530 that in turn communicates with a remote service provider 560 via a wide area network 550, e.g., the internet. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a radio frequency (RF) circuit to receive and process, from a first antenna or a second antenna, a RF signal, the RF circuit to obtain a digital signal from the RF signal, and the RF circuit having a single RF signal processing path;
   a baseband circuit coupled to the RF circuit to process the digital signal, the baseband circuit to determine a first metric for a first packet of the RF signal received via the first antenna, determine a second metric for the first packet of the RF signal received via the second antenna and determine a third metric for the first packet of the RF signal received via a third antenna, the first packet comprising a first management packet transmitted from an access point; and
   an antenna selection controller coupled to the baseband circuit, the antenna selection controller to cause the RF circuit to switch from receipt of the RF signal via the first antenna to receipt of the RF signal via the second antenna based at least in part on the first metric.

2. The apparatus of claim 1, wherein the baseband circuit is to determine a first channel quality metric for the first management packet and cause the RF circuit to switch from receipt of the RF signal via the first antenna to receipt of the RF signal via the second antenna based at least in part on the first channel quality metric.

3. The apparatus of claim 2, wherein the antenna selection controller is to send an antenna control signal to the RF circuit to cause the RF circuit to switch from the receipt of the RF signal via the first antenna to the receipt of the RF signal via the second antenna, when the first channel quality metric is less than a threshold.

4. The apparatus of claim 2, wherein a plurality of channel quality metrics are obtained corresponding to a plurality of antennas using the first management packet.

5. The apparatus of claim 1, wherein the baseband circuit is to determine the first metric based on a channel estimate, after detection of the first packet.

6. The apparatus of claim 1, wherein the baseband circuit is to determine the first metric based on an error vector magnitude value.

7. The apparatus of claim 1, wherein the antenna selection controller is to cause the RF circuit to switch from receipt of the RF signal via the first antenna to receipt of the RF signal via the second antenna during receipt of the first packet, when an expected signal strength of the first packet exceeds a threshold.

8. The apparatus of claim 7, wherein a switching from receipt of the RF signal via the first antenna to receipt of the RF signal via the second antenna during receipt of the first packet occurs during a cyclic prefix portion of the first packet.

9. The apparatus of claim 1, wherein the baseband circuit is to determine the first metric based on:
   a first training field of the first packet received via the first antenna; and
   a second training field of the first packet received via the second antenna.

10. The apparatus of claim 1, wherein, after the switch from the first antenna to the second antenna, the apparatus is to transmit a second RF signal via the second antenna.

11. The apparatus of claim 1, wherein the antenna selection controller is to cause the RF circuit to select one of the first, second and third antennas for receipt of a next packet based on at least one of the first metric, the second metric, or the third metric.

12. An apparatus comprising:
   a radio frequency (RF) circuit to receive and process, from a first antenna or a second antenna, a RF signal, the RF circuit to obtain a digital signal from the RF signal, and the RF circuit having a single RF signal processing path;
   a baseband circuit coupled to the RF circuit to process the digital signal, the baseband circuit to determine a first metric for a first packet of the RF signal received via the first antenna; and
   an antenna selection controller coupled to the baseband circuit, the antenna selection controller to cause the RF circuit to switch from receipt of the RF signal via the first antenna to receipt of the RF signal via the second antenna based at least in part on the first metric;

wherein the apparatus is to:

receive a first portion of the first packet via the first antenna, decode a MAC address of the first packet, and determine the first metric comprising a first channel quality metric for the first portion of the first packet received via the first antenna;

receive a second portion of the first packet via the second antenna and determine a second channel quality metric for the second portion of the first packet received via the second antenna;

receive a third portion of the first packet via a third antenna;

determine a third channel quality metric for the third portion of the first packet received via the third antenna; and select one of the first, second and third antennas for receipt of a next packet based on at least one of the first channel quality metric, the second channel quality metric, or the third channel quality metric.

13. A method comprising:

receiving, in a radio frequency (RF) circuit of a wireless device via a first antenna and a second antenna, a RF signal comprising a management packet from an access point;

processing, in the RF circuit, a first portion of the management packet received via the first antenna to obtain a first digital signal;

processing, in the RF circuit, a second portion of the management packet received via the second antenna to obtain a second digital signal;

selecting one of the first antenna and the second antenna for reception of one or more packets of the RF signal based on at least one of a first channel quality (CQ) metric associated with the first digital signal and a second CQ metric associated with the second digital signal; and switching a current antenna of the wireless device from the current antenna to the selected antenna if the current antenna is not the selected antenna.

14. The method of claim 13, further comprising:

receiving the RF signal via the first antenna during a first preamble field of the management packet; and receiving the RF signal via the second antenna during a second preamble field of the management packet.

15. The method of claim 13, further comprising determining the first CQ metric based at least in part on a channel estimate.

16. The method of claim 13, further comprising:

setting automatic gain control (AGC) circuitry of the RF circuit to a predetermined level; and thereafter receiving the RF signal comprising the management packet via the first antenna, wherein the predetermined level is based at least in part on an AGC setting of a previous packet of the RF signal.

* * * * *